R. M. JOHNSTON.
THRESHING MACHINE.
APPLICATION FILED OCT. 31, 1908.
917,308.
Patented Apr. 6, 1909.
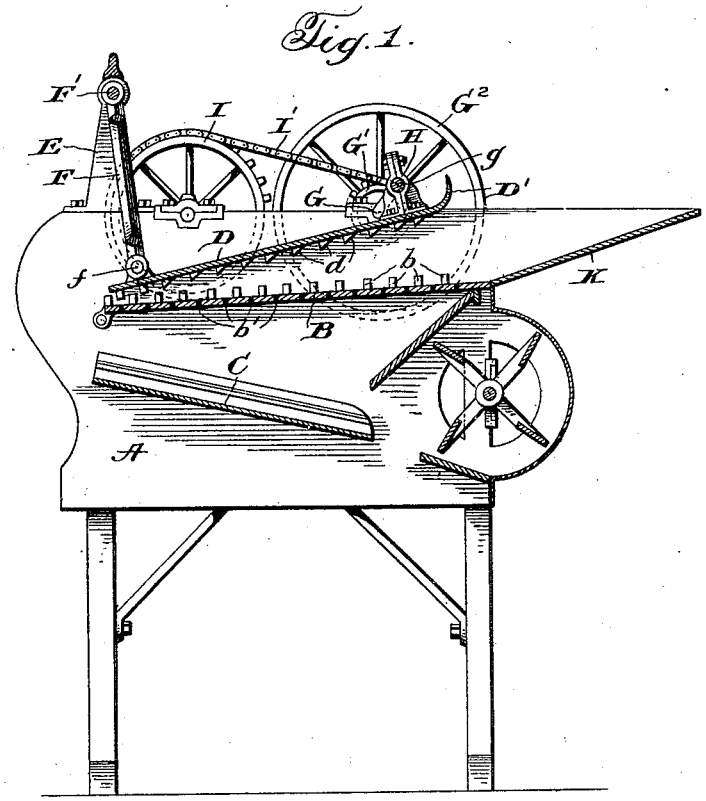
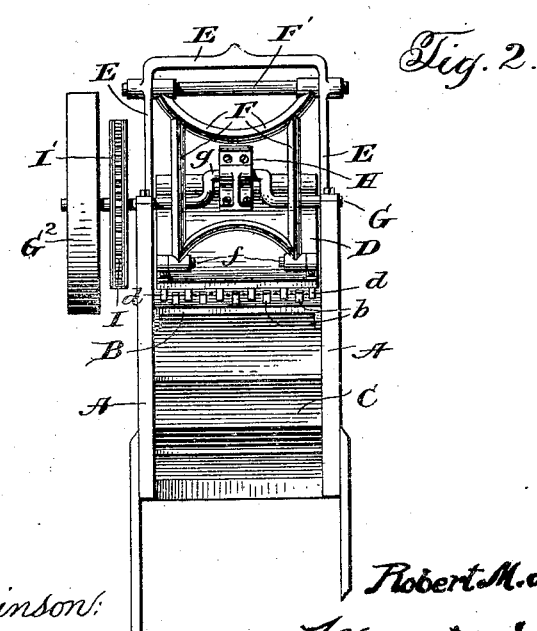
Witnesses:
Jas. E. Hutchinson
Thos. R. Heath
Inventor:
Robert M. Johnston,
By Vicor Milans, Attorneys.

UNITED STATES PATENT OFFICE.

ROBERT M. JOHNSTON, OF MORRISTOWN, TENNESSEE.

THRESHING-MACHINE.

No. 917,308.　　　Specification of Letters Patent.　　　Patented April 6, 1909.

Application filed October 31, 1908. Serial No. 460,423.

*To all whom it may concern:*

Be it known that I, ROBERT M. JOHNSTON, a citizen of the United States, residing at Morristown, in the county of Hamblen and State of Tennessee, have invented certain new and useful Improvements in Threshing-Machines, of which the following is a specification, reference being had therein to the accompanying drawing.

This invention relates to an improvement in threshing machines and more particularly to machines for threshing peas, beans and the like.

The object of the present invention is the provision of a simple and efficient device of this character which will effectively thresh all of the peas or beans fed thereto and separate the same from the hulls and chaff.

A further object of the invention is the provision of relatively movable threshing plates of an improved construction between which the peas, beans or the like are fed.

Other objects of the invention will be apparent from the detailed description hereinafter when read in connection with the accompanying drawing forming a part hereof, wherein a preferable embodiment of the invention is shown and wherein like characters of reference refer to similar parts in the several views.

In the drawings, Figure 1 is a longitudinal section of a threshing machine constructed in accordance with the present invention, and Fig. 2 is an end elevation thereof.

Referring now more particularly to the drawings, A designates the frame of the machine which is provided with parallel side walls between which is secured adjacent the upper ends thereof in any suitable manner a threshing plate B which is preferably formed of metal and is provided on the upper surface thereof with a plurality of projections or teeth $b$, which are rectangular in cross section and are arranged in regular rows which extend longitudinally of the thresher plate for the full length thereof. The thresher plate B is also provided with a plurality of apertures $b'$ extending therethrough through which the peas, beans, or grain are adapted to fall after they have been separated from the hulls and chaff, in the manner to be hereinafter more particularly set forth.

Positioned below the threshing plate B so as to receive the substances which pass therethrough is a downwardly inclined table C and mounted in the frame of the machine adjacent the lower end of said downwardly inclined table is a blower or fan of any well known type which is adapted to separate from the peas or beans during their passage down the plate C any dust or chaff which may have passed through the thresher plate B. Any suitable means may be provided for receiving the peas, beans, or grain discharged from the lower end of the table C.

D designates a thresher plate which is positioned opposite the thresher plate B heretofore described and to coöperate therewith to effect the threshing of the peas, beans, or grain fed therebetween. The thresher plate D is provided with a plurality of teeth $d$ which project from the under side thereof and are arranged in regular rows which extend longitudinally of the plate for the full length thereof, the rows of teeth on the plate D being adapted to work between the rows of teeth on the plate B. The teeth $d$ at the extreme outer end of the plate D are similar in configuration to the teeth $b$ of the plate B, that is they are substantially rectangular in cross section throughout their entire height. The remainder of the teeth $d$ of the plate D, however, are provided with abrupt front faces which extend substantially at right angles to the under side of the plate D and inclined rear surfaces, for a purpose to be hereinafter more particularly set forth.

E designates an inverted U-shaped yoke the lower ends of the arms of which are secured in any suitable manner upon the upper edges of the side walls of the frame of the machine adjacent the rear ends thereof.

F designates a hanger, the upper end of which is pivotally mounted upon a shaft F' which extends transversely of the yoke E and the lower end of which is pivotally connected in any suitable manner to the upper surface of the thresher plate D adjacent the rear end thereof. The hanger F preferably comprises parallel side bars, which are connected at their upper and lower ends by integral cross-bars, said side bars being provided at their upper ends with sleeves which loosely engage the shaft F' heretofore referred to and at the lower end thereof with sleeves which loosely engage stub shafts $f$, which are bolted or otherwise secured to the upper surface of the plate D adjacent the rear end thereof. The hanger F is of such a length that the rear end of the plate D is supported just out of contact with the rear end of the plate B positioned therebeneath.

G designates a shaft which is journaled in suitable bearings secured to the upper edges of the side walls of the frame A of the machine. The shaft G is provided intermediate the bearings therefor with a crank portion $g$, which loosely engages a bearing H which is secured to the upper surface of the thresher plate D adjacent the forward end thereof. The bearing H is formed in two sections which are clamped together so as to encircle the crank portion $g$ of the shaft G and are subsequently bolted or otherwise secured to the upper surface of the plate D. The shaft G is provided at one end thereof with a small sprocket wheel G', which is connected by a chain I' to a larger sprocket wheel I which is mounted on a shaft journaled in any suitable manner in the frame A of the machine. The shaft G is also preferably provided with a fly wheel $G^2$. The sprocket wheel I may be actuated in any suitable manner to impart rotation to the shaft G.

In the preferred form of the invention the thresher plate is substantially equal in area to the thresher plate B. It will be obvious, however, that if desired a plurality of plates D might be employed, the combined area of which would be substantially equal to the area of plate D.

The peas, beans, or grain to be treated are dumped on to a feed table K at the front end of the machine and pass from thence between the plates B and D, the forward end of the upper plate D being provided with an upwardly curved portion D', which acts as a deflector plate to prevent any of the peas or beans from getting on to the upper surface of said plate. During the operation of the machine, it will be apparent that the upper plate D will sweep over the lower plate B and the teeth on the upper plate D will during the outward movement of said plate pass between the teeth on the lower plate B so that any peas or beans which are between said plates will be thoroughly threshed. During the return movement of the upper plate D, however, all of the teeth thereon with the exception of those at the extreme outer end thereof will, owing to the action of the crank $g$ of the shaft G, be raised from between the teeth on the lower plate B, and the rearwardly inclined faces of said teeth will act to prevent any of the material on the lower plate from being dragged to the front end thereof. It will be noted that during the operation of the device the peas or beans are gradually moved toward the rear end of the lower plate B, at which point the hulls or pods are discharged. The teeth on the extreme rear ends of both the upper and lower plates D and B intermesh during both the outward and return movement of the plate D, and as said teeth are similarly formed on both the front and rear surfaces thereof, it will be seen that it will be practically impossible for any peas or beans to pass from between the plates without being threshed.

In the form of the invention illustrated in the accompanying drawing, it will be noted that the plate B is shown as a stationary plate positioned in a substantially horizontal plane, but it will be obvious that if it is desirable to do so, said plate may also be provided with means for imparting a vibratory movement thereto.

While a preferred form of the invention is herein shown and described, it will be obvious that many minor changes may be made without departing from the spirit of the invention as defined in the appended claims.

Having thus described my invention what I claim and desire to secure by Letters Patent is:

1. In a device of the character described, oppositely arranged threshing plates provided on the adjacent faces thereof with a plurality of projecting teeth, means for imparting an endwise movement to one end of one of said plates and to its other end a movement to and from the other of said plates to effect the feeding of material between the plates, whereby the teeth at the discharge ends of the plates will continually intermesh and the other teeth on the plates will intermesh on the feeding movement of the movable plate only.

2. In a device of the character described, a thresher plate, a movable plate arranged opposite thereto, means for supporting one end of the movable plate and permitting an endwise reciprocatory movement thereof, and a rotary driving member operatively connected to the other end of said movable plate.

3. In a device of the character described, a thresher plate, a movable plate arranged opposite thereto, said plates being provided with a plurality of oppositely extending teeth, the teeth on one plate being positioned between the teeth on the other plate, means for supporting one end of the movable plate so as to permit an endwise reciprocatory movement thereof, a rotary driving member, and means connecting the rotary driving member, to the other end of the movable plate.

4. In a device of the character described, a thresher plate, a movable thresher plate arranged opposite thereto, said plates being provided with a plurality of oppositely extending teeth, links supporting one end of the movable plate, and a rotary driving member operatively connected to the other end of said movable plate.

5. In a device of the character described, a thresher plate, a movable thresher plate arranged opposite thereto, said plates being provided with a plurality of oppositely extending teeth, means for supporting one end of the movable plate so as to permit a reciprocatory movement thereof, a drive shaft provided with a crank portion, and means connecting the crank portion of the drive shaft to the other end of the movable thresher plate.

6. In a device of the character described, a thresher plate, a movable thresher plate arranged opposite thereto, said plates being provided with a plurality of oppositely extending teeth, links supporting one end of the movable plate, a drive shaft having a crank portion, and means for connecting the crank portion of the drive shaft to the other end of said movable plate.

7. In a device of the character described, a relatively fixed thresher plate provided with a plurality of teeth projecting therefrom, a movable thresher plate arranged opposite said relatively fixed plate and provided with a plurality of teeth projecting therefrom, means for supporting the outer end of the movable plate so as to permit an endwise reciprocatory movement thereof, the teeth on the outer end of said movable plate being adapted to continuously mesh with the teeth on the outer end of the relatively fixed plate, and a rotary driving member operatively connected to the inner end of the movable plate.

8. In a device of the character described, a frame, a relatively fixed thresher plate positioned in said frame and provided with a plurality of teeth projecting therefrom, an endwise movable thresher plate provided with a plurality of teeth projecting therefrom, links pivoted to the frame and supporting the outer end of said movable plate so that the teeth thereon will constantly mesh with the teeth on the fixed plate, a rotary driving shaft journaled in the frame and provided with a crank portion, and means connecting the crank portion of the drive shaft to the inner end of the movable plate.

9. In a device of the character described, a frame comprising parallel side walls, a relatively fixed thresher plate secured between the side walls of the frame, a movable thresher plate secured above said relatively fixed thresher plate and arranged to coöperate therewith, a yoke supported upon the side walls of said frame, pivoted links depending from said yoke and connected to one end of the movable plate, a drive shaft extending transversely of the frame and provided with a crank portion therein, and a split bearing secured to the other end of said movable plate and embracing the crank portion of said shaft.

10. In a device of the character described, a relatively fixed thresher plate provided with a plurality of teeth projecting upwardly therefrom, said teeth being substantially rectangular in cross section, a movable plate provided with a plurality of teeth projecting downwardly therefrom, the teeth at the outer end of said movable plate being substantially rectangular in cross section and the other teeth on the movable plate being provided with abrupt outer faces and sloping inner faces, means for supporting the outer end of the movable plate so as to permit a reciprocatory movement thereof and so that the teeth on the outer end thereof will constantly mesh with the teeth on the outer end of the lower plate, and a rotary driving member operatively connected to the inner end of the movable plate.

11. In a device of the character described, a frame, a relatively fixed thresher plate secured therein, an endwise movable thresher plate positioned over said relatively fixed thresher plate and having its inner end extended upwardly, means for supporting the outer end of the movable plate in close proximity to the relatively fixed plate so as to permit a reciprocatory movement thereof, and a rotary driving member operatively connected to the inner end of said movable plate.

In testimony whereof I affix my signature in presence of two witnesses.

ROBERT M. JOHNSTON.

Witnesses:
  CARL B. LEE,
  JOHN B. HOLLOWAY.